United States Patent Office.

JAMES SHAW, OF PHILADELPHIA, PENNSYLVANIA, ASSIGNOR TO CONYERS BUTTON, OF SAME PLACE.

Letters Patent No. 106,219, dated August 9, 1870.

IMPROVED COMPOSITION FOR OILING WOOL.

The Schedule referred to in these Letters Patent and making part of the same

I, JAMES SHAW, of Philadelphia, county of Philadelphia, State of Pennsylvania, have invented a Composition for Oiling Wool, of which the following is a specification.

Nature and Object of my Invention.

My invention consists of a cheap and efficient composition, described hereafter, to be used for oiling wool, in the place of the more costly lubricants heretofore employed for that purpose.

General Description.

My composition contains the following ingredients:
Carrageen, or Irish moss, four pounds; liquid ammonia, two quarts; brown soap, four pounds; sal-soda, four pounds; oil, six gallons; chamber-lye, six gallons; water, forty gallons.

With these ingredients, I prepare the composition in the following manner:

I take the Irish moss, place it in a coarse bag, and boil it for about twelve hours in fifteen gallons of the water, the moss being finally strained through the same bag.

The soap and soda I boil together until dissolved, in fifteen gallons of the water. These two solutions I then mix together, and then add the oil and chamber-lye and ten gallons of the water, the ammonia being added after all the other ingredients.

Any of the oils heretofore employed as lubricants for wool may be used as one of the ingredients of the composition.

The proportions of the ingredients given above may be varied to a limited extent without departing from my invention.

Claim.

A wool-oiling composition, consisting of the ingredients described, prepared in the proportion and manner substantially as set forth.

In testimony whereof I have signed my name to this specification in the presence of two subscribing witnesses.

JAMES SHAW.

Witnesses:
WM. A. STEEL,
HARRY SMITH.